United States Patent
Arceo et al.

(10) Patent No.: US 9,845,046 B1
(45) Date of Patent: Dec. 19, 2017

(54) LASER PROJECTED LINES TO INDICATE WHILE DRIVING IN SEMI-TRUCK BLIND SPOTS

(71) Applicant: DENSO International America, Inc., Southfield, MI (US)

(72) Inventors: Marc Arceo, Livonia, MI (US); Gareth Webb, Farmington, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/183,060

(22) Filed: Jun. 15, 2016

(51) Int. Cl.
*G08B 21/00* (2006.01)
*B60Q 1/50* (2006.01)
*B60Q 1/26* (2006.01)

(52) U.S. Cl.
CPC ............. *B60Q 1/50* (2013.01); *B60Q 1/2615* (2013.01); *B60Q 1/503* (2013.01); *B60Q 2400/50* (2013.01)

(58) Field of Classification Search
CPC ....................................................... B60Q 1/50
USPC .................. 340/435, 468, 469, 470, 479
See application file for complete search history.

(56) References Cited

U.S. PATENT DOCUMENTS

| | | | |
|---|---|---|---|
| 6,128,559 A | 10/2000 | Saitou et al. | |
| 6,133,851 A * | 10/2000 | Johnson | B60Q 1/30 340/431 |
| 6,733,134 B2 | 5/2004 | Bleiner | |
| 6,866,232 B1 | 3/2005 | Finney | |
| 6,967,593 B2 | 11/2005 | Carroll | |
| 7,175,321 B1 | 2/2007 | Lopez | |
| 9,551,867 B1 | 1/2017 | Grabowski et al. | |
| 2005/0117364 A1 | 6/2005 | Rennick et al. | |
| 2006/0225329 A1 | 10/2006 | Morrow | |
| 2007/0053195 A1 | 3/2007 | Alberti | |
| 2009/0323046 A1 | 12/2009 | Tan et al. | |
| 2010/0017111 A1 | 1/2010 | Stefani | |
| 2010/0256852 A1 | 10/2010 | Mudalige | |
| 2012/0025962 A1* | 2/2012 | Toll | B60Q 1/50 340/431 |
| 2013/0335212 A1 | 12/2013 | Purks et al. | |
| 2015/0203023 A1 | 7/2015 | Marti et al. | |
| 2016/0019782 A1 | 1/2016 | Alam et al. | |
| 2016/0026187 A1 | 1/2016 | Alam et al. | |
| 2016/0357187 A1 | 12/2016 | Ansari | |

FOREIGN PATENT DOCUMENTS

| | | |
|---|---|---|
| EP | 2985182 A2 | 2/2016 |
| JP | 2004-182121 A | 7/2004 |
| JP | 2015-137097 A | 7/2015 |

OTHER PUBLICATIONS

U.S. Appl. No. 15/183,008, filed Jun. 15, 2016, Denso International America, Inc.
U.S. Appl. No. 15/182,948, filed Jun. 15, 2016, Denso International America, Inc.

* cited by examiner

*Primary Examiner* — Jeffery Hofsass
(74) *Attorney, Agent, or Firm* — Harness, Dickey & Pierce, P.L.C.

(57) ABSTRACT

A system and method are provided and include light source projectors with positional actuators mounted on a subject vehicle. A controller controls the light source projectors and the positional actuators to project at least one laser line on a roadway upon which the subject vehicle is traveling. A location of the at least one laser line corresponds to at least one blind spot alert area of the subject vehicle.

16 Claims, 5 Drawing Sheets

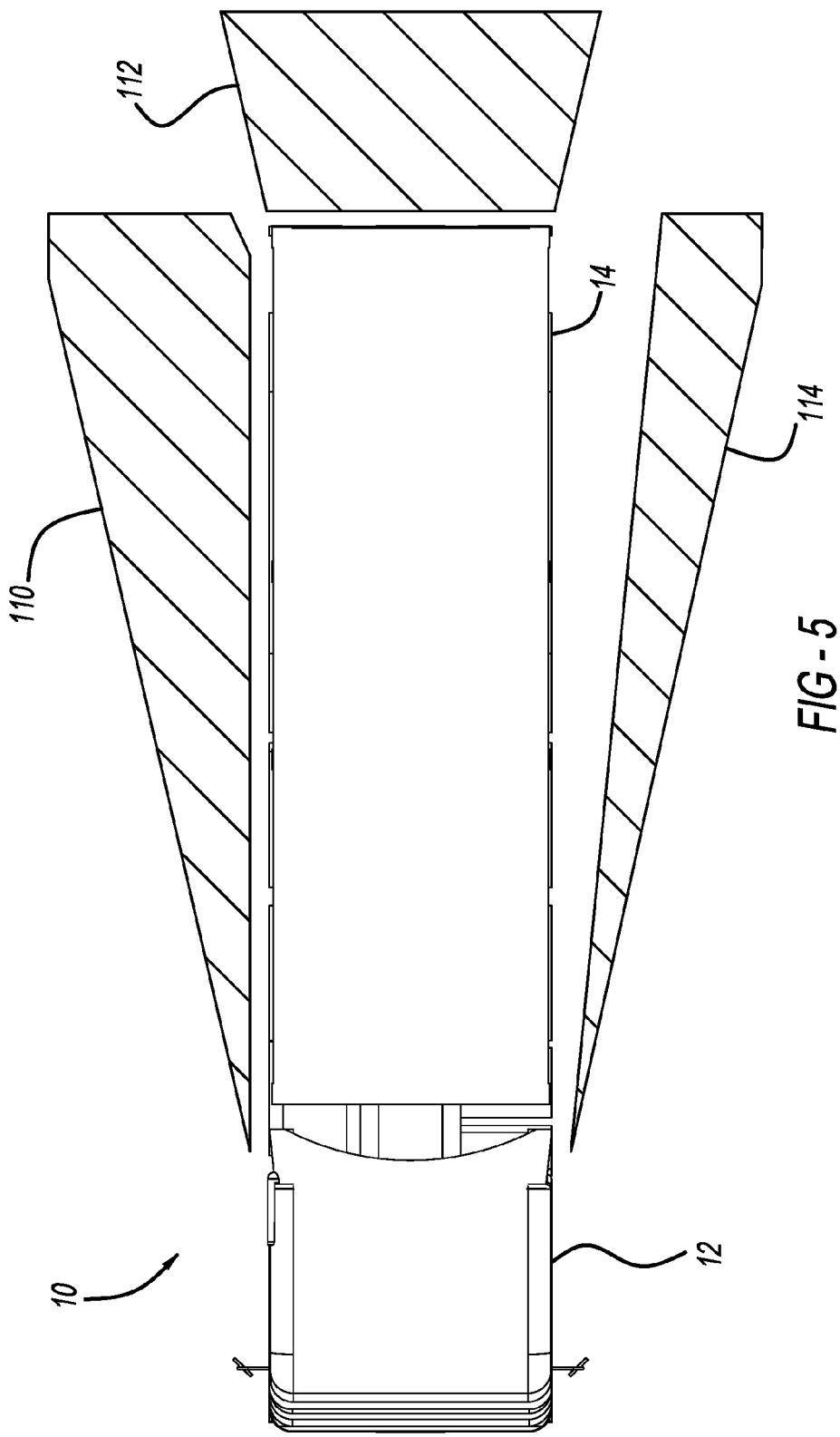

US 9,845,046 B1

LASER PROJECTED LINES TO INDICATE WHILE DRIVING IN SEMI-TRUCK BLIND SPOTS

FIELD

The present disclosure relates to systems and methods that project laser lines for indicating that a secondary vehicle is located in a blind spot of a subject vehicle, such as a semi-truck.

BACKGROUND

This section provides background information related to the present disclosure, which is not necessarily prior art.

Blind spot monitoring systems are used to sense secondary vehicles located in a blind spot of a subject vehicle and to alert the driver of the subject vehicle that the secondary vehicle is located in the subject vehicle's blind spot. While such blind spot monitoring systems alert the driver of the subject vehicle to the existence of the secondary vehicle located in the subject vehicle's blind spot, such systems do not alert the driver of the secondary vehicle and are subject to improvement.

SUMMARY

This section provides a general summary of the disclosure, and is not a comprehensive disclosure of its full scope or all of its features.

The present teachings include systems and methods for projecting laser lines onto a roadway. Light source projectors with positional actuators are mounted on a subject vehicle. A controller controls the light source projectors and the positional actuators to project at least one laser line on a roadway upon which the subject vehicle is traveling. A location of the at least one laser line corresponds to at least one blind spot alert area of the subject vehicle.

The present teachings also include systems and methods for projecting a graphical display with a warning symbol onto a side of a subject vehicle.

The present teachings also include systems and methods for controlling warning lights mounted to a side of a vehicle. A first plurality of warning lights and a second plurality of warning lights are mounted to a side of the subject vehicle. A blind spot monitoring system with a blind spot sensor monitors the at least one blind spot alert area and detects when a secondary vehicle enters the at least one blind spot alert area. A controller is in communication with the blind spot monitoring system. The controller controls the first and second plurality of warning lights, determines a location of the secondary vehicle within the at least one blind spot alert area, and illuminates one of the first and second plurality of warning lights corresponding to the location of the secondary vehicle within the at least one blind spot alert area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 5 is an overhead view illustrating blind spot areas of the subject vehicle.

Corresponding reference numerals indicate corresponding parts throughout the several views of the drawings.

DETAILED DESCRIPTION

Example embodiments will now be described more fully with reference to the accompanying drawings.

Figure 1:
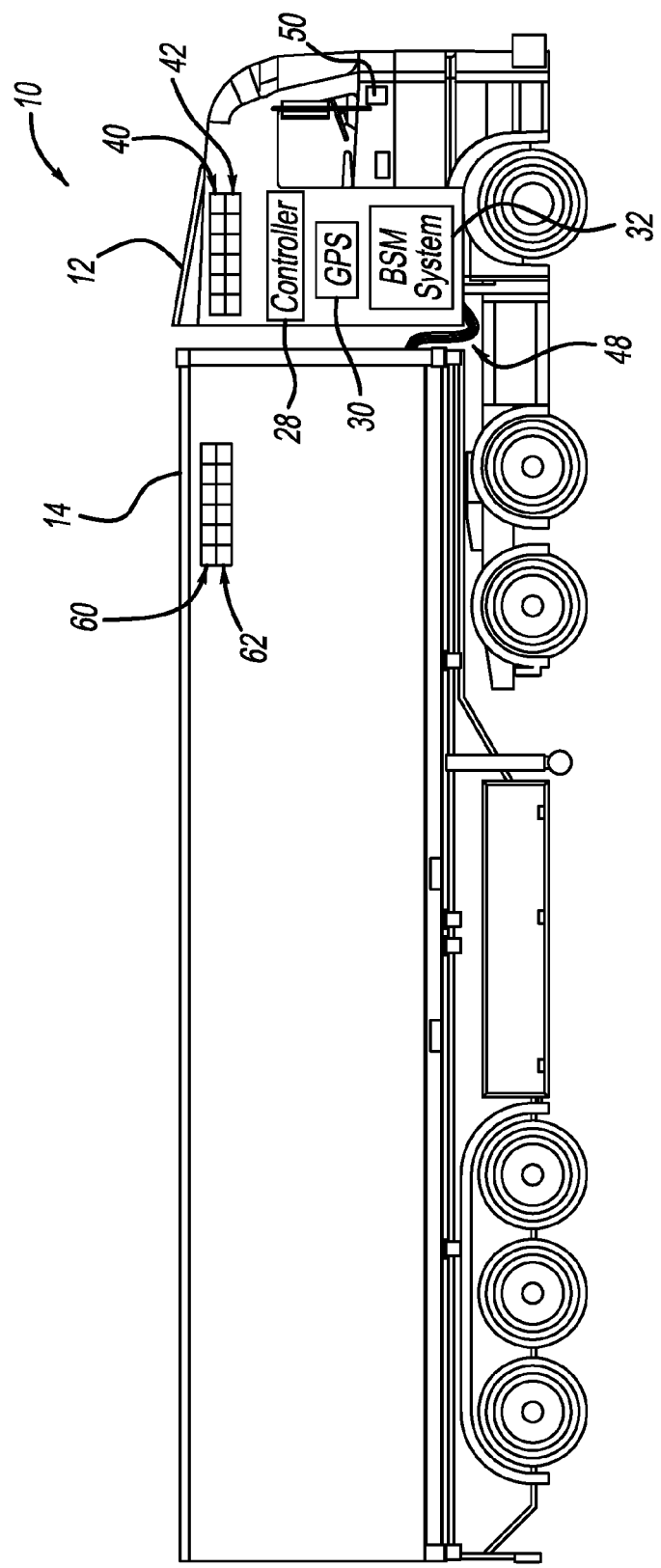
FIG. 1 illustrates a subject vehicle with a laser line and graphics projection system.

With reference to FIG. 1, a vehicle 10 including a laser line and graphics projection system is illustrated. Although the vehicle 10 is illustrated as a semi-trailer truck in FIG. 1, the present teachings apply to any other suitable vehicle, such as an automobile, sport utility vehicle (SUV), a mass transit vehicle (such as a bus), or a military vehicle, as examples. In the example of FIG. 1, the vehicle 10 includes a tractor unit 12 and a semi-trailer 14 that is coupled to and towed by the tractor unit 12.

The vehicle 10 includes a controller 28 that controls the laser line and graphics projection system, as described in further detail below. The vehicle 10 can also include a global positioning system (GPS) 30 that detects or determines a current location of the vehicle 10. The vehicle 10 can also include a blind spot monitoring (BSM) system 32 and a blind spot sensor 50 that detects when secondary vehicles are located within a blind spot of the vehicle 10. The BSM system 32 alerts a driver of the vehicle 10 when secondary vehicles are located within the blind spot of the vehicle 10. In this application, including the definitions below, the terms "controller," "module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the controller, modules, and systems described herein. In addition, in this application the terms "module" or "controller" may be replaced with the term "circuit."

The blind spot sensor 50 is a sensor configured to identify objects, such as other vehicles, in a blind spot alert area of the subject vehicle 10. With reference to FIG. 5, three blind spot alert areas of the subject vehicle 10 are shown. The blind spot alert areas include, for example, a passenger side blind spot alert area 110, a rear blind spot alert area 112, and a driver side blind spot alert area 114. As shown in FIG. 5, due to the left hand driver position of the subject vehicle, the passenger side blind spot alert area 110 is larger than the driver side blind spot area 112.

With reference again to FIG. 1, the blind spot sensor 50 can include any suitable sensor, such as a radar, Lidar, camera, ultrasonic, or other suitable sensor for detecting objects in a blind spot alert area of the subject vehicle 10. While a single blind spot sensor 50 is shown in FIG. 1, additional blind spot sensors 50 can be used and positioned around the vehicle. For example, the blind spot sensors 50 can be mounted near a side view mirror of the vehicle 10 on both the driver side and the passenger side and/or at any other suitable position on the tractor unit 12 of the vehicle 10. Additionally, blind spot sensors 50 can be mounted on the sides of the semi-trailer 14 and/or on a rear side of the semi-trailer 14. Data from the blind spot sensors 50 can be communicated to and received by the BSM system 32 and/or by the controller 28.

With continued reference to FIG. 1, the vehicle 10 includes a first bank of light source projectors 40 mounted on a top portion of the vehicle 10, such as, for example, a top portion of the tractor unit 12, with each light source projector 40 having a corresponding positional actuator 42. In the example of FIG. 1, the light source projectors 40 are positioned on an upper portion of a passenger side of the tractor unit 12. In addition, a second bank of light source projectors, with corresponding positional actuators, can also be positioned on an upper portion of a driver side of the tractor unit 12. Additionally or alternatively, the light source projectors 40 can be positioned at other locations on the tractor unit 12. The vehicle 10 can also include a third bank of light source projectors 60 mounted, for example, on an upper portion of the passenger side of the semi-trailer 14 of the vehicle 10, with each light source projector 60 having a corresponding positional actuator 62. In addition, a fourth bank of light source projectors, with corresponding positional actuators, can also be positioned on an upper portion of the driver side of the semi-trailer 14 of the vehicle. In the example of FIG. 1, the light source projectors 60 are positioned on an upper portion of a side of the semi-trailer 14. Additionally or alternatively, the light source projectors 60 can be positioned at other locations on the semi-trailer 14 or on the tractor unit 12. As used herein, the laser line and graphics projection system includes, for example, the controller 28, the light source projectors 40, 60, and the corresponding positional actuators 42, 62.

The light source projectors 40, 60 can include a suitable light source, such as a laser diode emitting a laser beam of visible light. Additionally or alternatively, the light source projectors 40, 60 can include other light emitting diodes (LEDs), or other light sources, such as incandescent light sources, halogen light sources, xenon light sources, light bulbs, or other suitable light sources configured to produce a suitable beam of light that can be focused and directionally projected onto the roadway of the vehicle 10, onto a secondary vehicle, and/or onto a side of the vehicle 10, as discussed in further detail below.

The positional actuators 42, 62 are controlled by the controller 28 and can adjust a directional position of the light source projectors 40, 60 to project laser lines and graphics onto a roadway upon which the vehicle 10 is traveling, onto a secondary vehicle located in a blind spot of the vehicle 10, and/or onto a side of the vehicle 10, such as a side of the semi-trailer 14 of the vehicle 10. The controller 28 can communicate with the positional actuators 62 and light source projectors 60 located on the semi-trailer 14 through an electrical communication bus 48 between the tractor unit 12 and the semi-trailer 14. The controller 28 can control one or more of the light sources in the banks of light source projectors 40, 60 by rapidly positioning the corresponding positional actuators to rapidly trace an outline of a laser line and/or graphic on the roadway of the vehicle, on a secondary vehicle, and/or on the side of the vehicle 10. In this way, the controller 28 can control the positional actuators 42 such that the light source projectors 40 project laser lines and graphics, as discussed in further detail below. The term laser lines, as used in the context of the laser lines projected by the light source projectors 40 onto the roadway, refer to clearly defined and distinct lines of light projected onto the roadway (shown, for example, as projected laser lines 70 in FIGS. 2 and 3).

The controller 28 can control the positional actuators 42 such that the light source projectors 40 project laser lines indicating a blind spot of the vehicle 10. In addition, the controller 28 can control the positional actuators 62 such that the light source projectors 60 project a graphic onto the side of the vehicle 10, such as a side of the semi-trailer 14 of the vehicle 10. For example, the controller 28 can receive data from the BSM system 32 indicating that one or more of the blind spot sensors 50 are detecting a secondary vehicle located in a blind spot alert area of the vehicle 10. The controller 28, for example, can then monitor a length of time that the secondary vehicle remains located in the blind spot alert area of the vehicle and then take appropriate action to control the positional actuators 42, 62 and light source projectors 40, 60 to alert the driver of the secondary vehicle. For example, the controller 28 can change a color of the laser lines 70 projected onto the roadway of the vehicle and/or onto the secondary vehicle by the light source projectors 40. Additionally or alternatively, the controller 28 can project a warning sign or message onto a side of the vehicle 10, such as a side of the semi-trailer 14 of the vehicle 10, alerting the driver of the secondary vehicle that the secondary vehicle is located in the blind spot alert area of the vehicle 10.

While the vehicle is traveling on the roadway, the controller 28 can control the light source projectors 40 and the positional actuators 42 to project laser lines 70 on the roadway corresponding to one or more blind spot alert areas of the vehicle 10, using a first color (e.g., blue or green) for the projected laser lines 70. In one example, the controller 28 can control the light source projectors 40 and the positional actuators 42 to project laser lines 70 on the roadway corresponding to one or more blind spot alert areas of the vehicle 10 at all times while the vehicle 10 is traveling on the roadway. Alternatively, the controller 28 may control the light source projectors 40 and the positional actuators 42 to project the laser lines 70 on the roadway only when a secondary vehicle is detected in or near one of the blind spot alert areas of the vehicle 10. Alternatively the controller 28 may control the light source projectors 40 and the positional actuators 42 to project the laser lines 70 on the roadway when a secondary vehicle has been detected in a blind spot alert area of the vehicle 10 within a predetermined amount of time (e.g., within the last ten or fifteen minutes). In such case, if a secondary vehicle has not been detected within a blind spot alert area of the vehicle 10 within the predetermined amount of time, the controller 28 may turn off the light source projectors 40.

When a secondary vehicle is detected by one of the blind spot sensors 50, the BSM system 32 can notify the controller 28 that a secondary vehicle (e.g., secondary vehicle 72 shown in FIGS. 2 and 3) has been detected in a blind spot alert area of the vehicle 10. The controller 28 may then communicate with the BSM system 32 to monitor a length of time that the secondary vehicle 72 remains within the blind spot alert area of the vehicle 10. When the length of time that the secondary vehicle 72 remains within the blind spot alert area of the vehicle 10 exceeds a first predetermined time threshold, such as thirty seconds or one minute, the controller 28 may then control the light source projectors 40 to change a color of the laser lines 70 to a second color (e.g., yellow). In addition, when the length of time that the secondary vehicle 72 remains within the blind spot alert area of the vehicle 10 exceeds a second predetermined time threshold, such as one minute and thirty seconds or two minutes, the controller 28 may then control the light source projectors 40 to change a color of the laser lines 70 to a third color (e.g., red). In this way, the controller 28 can control the light source projectors 40 to change a color of the laser lines from a first color (e.g., blue or green) to a second color (e.g., yellow) and then to a third color (e.g., red) depending on the amount of time that the secondary vehicle remains within the blind spot of the vehicle 10. In this way, a driver of the secondary vehicle 72 can be alerted that the secondary vehicle 72 has been located within the blind spot alert area of the vehicle 10 for too long of a time and can be prompted to move the secondary vehicle 72 outside of the blind spot alert area of the vehicle 10.

Figure 2:
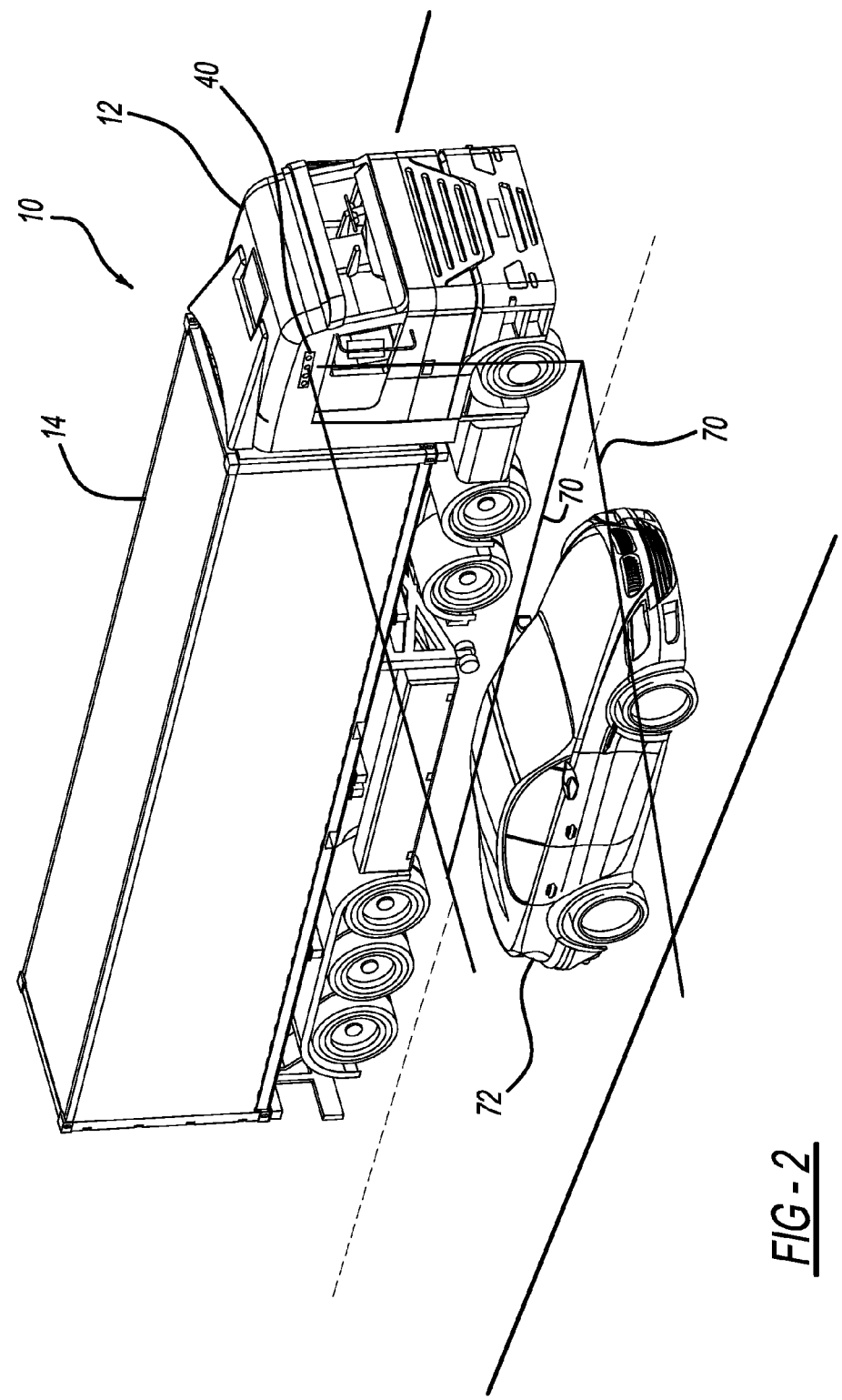
FIG. 2 illustrates the subject vehicle with the laser line and graphics projection system projecting laser lines on the roadway to visually indicate a blind spot of the subject vehicle.

With reference to FIG. 2, the secondary vehicle 72 is shown traveling in a blind spot alert area of the vehicle 10. As shown in FIG. 2, the light source projectors 40 project laser lines 70 onto the roadway upon which the vehicle 10 and the secondary vehicle 72 are traveling. As further shown in FIG. 2, the light source projectors 40 project one of the laser lines 70 onto a portion of the hood of the secondary vehicle 72. In this way, the driver of the secondary vehicle 72 can observe the laser line 70 projected across the hood of the secondary vehicle 72 and be alerted that the secondary vehicle 72 is traveling in the blind spot alert area of the vehicle 10. As described above, the projected laser line 70 may initially be projected using a first color (e.g., blue or green). Once the secondary vehicle 72 has remained in the blind spot alert area of the vehicle 10 for longer than a first predetermined time threshold, the controller 28 may control the light source projectors 40 to change the color of the laser lines 70 to a second color (e.g., yellow). In this way, the driver of the secondary vehicle 72 can be alerted that the secondary vehicle 72 has remained in the blind spot alert area of the vehicle 10 for an extended period of time and can be prompted to move the secondary vehicle 72 outside of the blind spot alert area of the vehicle 10.

As further described above, once the secondary vehicle 72 has remained in the blind spot alert area of the vehicle 10 for longer than a second predetermined time threshold, the controller 28 may control the light source projectors 40 to change the color of the laser lines 70 to a third color (e.g., red). In this way, the driver of the secondary vehicle 72 can be alerted that the secondary vehicle 72 has remained in the blind spot alert area of the vehicle 10 for an additional extended period of time and can be prompted to move the secondary vehicle 72 outside of the blind spot alert area of the vehicle. Additionally or alternatively, the controller 28 can control the light source projectors 40 to flash or blink the laser lines 70 to alert the driver of the secondary vehicle 72 that the secondary vehicle is traveling in and/or has remained within the blind spot alert area of the vehicle 10.

Figure 3:
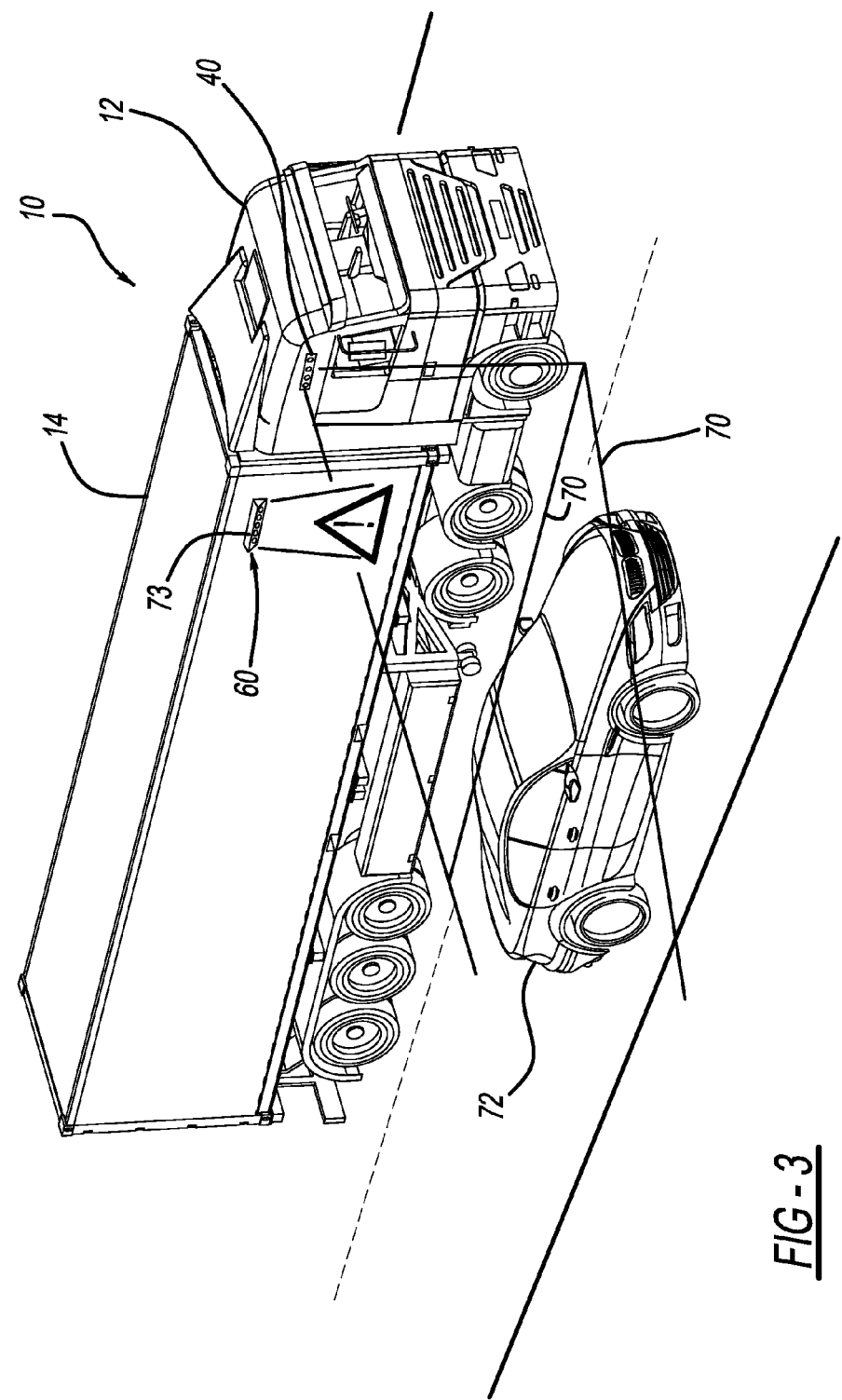
FIG. 3 illustrates the subject vehicle with the laser line and graphics projection system projecting laser lines on the roadway to visually indicate the blind spot of the subject vehicle and projecting a graphical warning sign onto a side of the subject vehicle.

With reference to FIG. 3, the additional bank of light source projectors 60 are shown mounted to an upper side of the semi-trailer 14. As shown in FIG. 3, the bank of light source projectors 60 can be mounted within a housing 73 configured such that the bank of light source projectors 60 is angled downward to project laser light graphics onto the side of the vehicle 10 (e.g., the side of the semi-trailer 14). The positional actuators 62 (shown in FIG. 1) for the light source projectors 60 can be housed within an interior of the housing 73. While the additional bank of light source projectors 60 are shown mounted to the upper side of the semi-trailer 14, the additional bank of light source projectors 60 could alternatively be mounted to an upper portion of the tractor unit 12 and angled towards the semi-trailer 14.

As shown in FIG. 3, the controller 28 can control the additional bank of light source projectors 60 and associated positional actuators 62 (shown in FIG. 1) to project a graphical warning display onto a side of the vehicle 10 (e.g., the side of the semi-trailer 14). For example, when one of the blind spot sensors 50 detects that the secondary vehicle has remained within the blind spot alert area of the vehicle 10 for longer than a predetermined time threshold, the controller 28 can control the additional bank of light source projectors 60 and associated positional actuators 62 to project the graphical warning display onto the side of the vehicle 10 (e.g., the side of the semi-trailer 14). While the graphical warning display shown in FIG. 2 appears as a triangular shaped display, other graphical warning symbols or words can alternatively be used. In addition, instead of using the additional bank of light source projectors 60, a light-up sign mounted to the side of the vehicle 10 and illuminated with LEDs or other suitable light sources could alternatively be used. In this way, additional graphical indicia can be displayed to the driver of the secondary vehicle 72 alerting the driver that the secondary vehicle 72 has remained in the blind spot alert area of the vehicle 10 for an extended period of time. Additionally or alternatively, the controller 28 can control the additional light source projectors 60 to blink or flash when the secondary vehicle 72 has remained in the blind spot of the vehicle 10 for an additional extended period of time.

Figure 4:
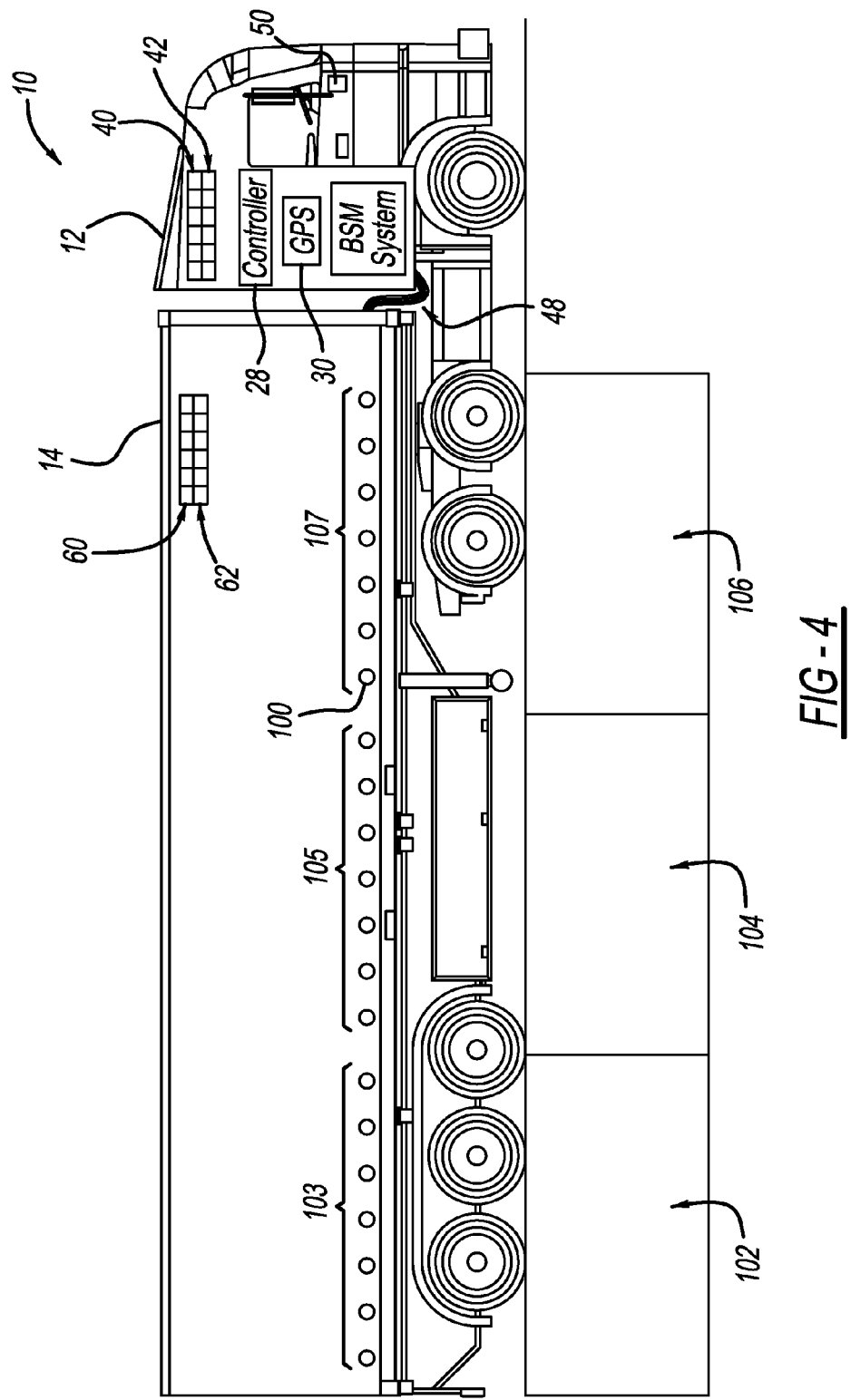
FIG. 4 illustrates a subject vehicle with a laser line and graphics projection system and with warning lights on a side of the subject vehicle.

With reference to FIG. 4, in addition to the laser line and graphics projection system described above, the vehicle 10 can also be configured with warning lights 100 along a side of the vehicle 10. For example, as shown in FIG. 4, the semi-trailer 14 of the vehicle 10 can be configured with warning lights 100 mounted to a side of the semi-trailer 14 of the vehicle 10. The warning lights can include LEDs, or other light sources, such as incandescent light sources, halogen light sources, xenon light sources, light bulbs, or other suitable light sources. The warning lights 100 are controlled by the controller 28 via communication through the electrical communication bus 48. As shown in FIG. 4, the warning lights 100 can be divided into warning light groups 103, 105, 107, with each warning light group corresponding to a section 102, 104, 106 of the blind spot alert area of the vehicle 10. For example, warning light group 103 corresponds to section 102 of the blind spot of the vehicle 10, warning light group 105 corresponds to section 104 of the blind spot of the vehicle 10, and warning light group 107 corresponds to section 106 of the blind spot of the vehicle 10.

The controller 28 can receive a location of a secondary vehicle 72 located within the blind spot alert area of the vehicle 10 and determine which section 102, 104, 106 of the blind spot alert area the secondary vehicle 72 is located within. The controller 28 can then control the warning lights 100 such that when the secondary vehicle enters a particular section 102, 104, 106 of the blind spot alert area, the corresponding warning lights 100 in the corresponding warning light group 103, 105, 107 are illuminated. Alternatively, the controller 28 can determine a length of time that a secondary vehicle 72 has remained within a particular section 102, 104, 106 of the blind spot of the vehicle 10 and illuminate the warning lights 100 for the corresponding warning light group 103, 105, 107 once the secondary vehicle 72 has remained within the particular section 102, 104, 106 for longer than a predetermined period of time.

While three warning light groups 103, 105, 107 are shown in FIG. 4, additional or fewer warning light groups can be used. Further, the controller 28 can alternatively select individual warning lights 100 for illumination based on a location of the secondary vehicle 72 within the blind spot alert area of the vehicle 10. For example, the controller 28 can receive a location of the secondary vehicle 72 within the blind spot alert area of the vehicle 10 and select a group of warning lights 100 that correspond to the location of the secondary vehicle 72 within the blind spot alert area of the vehicle 10.

In this way, the warning lights 100 can alert the driver of the secondary vehicle 72 that the secondary vehicle 72 has remained in the blind spot alert area of the vehicle 10, including a particular section or location within the blind spot alert area of the vehicle 10, for an extended period of time.

The controller 28 may use location and map information received from the GPS 30 to adjust operation of the laser line and graphics projection system. For example, based on location and map information received from the GPS 30, the controller 28 may determine that a detected object within a blind spot alert area of the vehicle 10 is located in another area and not likely to collide with the vehicle 10. For example, the controller 28 may determine that the detected object is located within a separate lane of a divided highway or on an exit lane. In such case, the controller 28 may disable the laser line and graphics projection system and/or disable the warning lights 100.

As such, the laser line and graphics projection system of the present disclosure can beneficially project laser lines 70 (as shown in FIGS. 2 and 3) to alert a driver of a secondary vehicle 72 that the secondary vehicle 72 is or has been traveling in a blind spot alert area of the vehicle 10 for an extended period of time and can prompt the driver to move the secondary vehicle 72 out of the blind spot alert area of the vehicle. Additionally, the laser line and graphics projection system of the present disclosure can beneficially project a graphical warning display onto a side onto a side of the vehicle (as shown in FIG. 3) to alert a driver of a secondary vehicle 72 that the secondary vehicle 72 is or has been traveling in a blind spot alert area of the vehicle 10 for an extended period of time and can prompt the driver to move the secondary vehicle 72 out of the blind spot alert area of the vehicle. Additionally, the system of the present disclosure can also beneficially illuminate warning lights 100 (as shown in FIG. 4) to alert a driver of a secondary vehicle 72 that the secondary vehicle 72 is or has been traveling in a blind spot alert area of the vehicle 10 for an extended period of time and can prompt the driver to move the secondary vehicle 72 out of the blind spot alert area of the vehicle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   at least one light source projector with at least one positional actuator mounted on a subject vehicle;
   a controller that controls the at least one light source projector and the at least one positional actuator to project at least one laser line on a roadway upon which the subject vehicle is traveling, a location of the at least one laser line corresponding to at least one blind spot alert area of the subject vehicle; and
   a blind spot monitoring system with a blind spot sensor that monitors the at least one blind spot alert area and detects when a secondary vehicle enters the at least one blind spot alert area;
   wherein the controller is in communication with the blind spot monitoring system and controls the at least one light source projector to project the at least one laser line on the roadway with a first color in response to the blind spot monitoring system detecting that no secondary vehicles are located within the at least one blind spot alert area, with a second color in response to the blind spot monitoring system detecting that a secondary vehicle has been located within the at least one blind spot alert area for a first predetermined time period, and with a third color in response to the blind spot monitoring system detecting that the secondary vehicle has been located within the at least one blind spot alert area for a second predetermined time period.

2. The system of claim 1,
   wherein the controller is in communication with the blind spot monitoring system and controls the at least one light source projector to change a color of the at least one laser line projected on the roadway in response to the blind spot monitoring system detecting a secondary vehicle located in the at least one blind spot alert area.

3. The system of claim 1,
   wherein the controller is in communication with the blind spot monitoring system and controls the at least one light source projector to perform blinking or flashing of the at least one laser line projected on the roadway in response to the blind spot monitoring system detecting a secondary vehicle located in the at least one blind spot alert area.

4. The system of claim 1, further comprising:
   at least one additional light source projector with at least one additional positional actuator mounted on the subject vehicle;
   wherein the controller controls the at least one additional light source projector and the at least one additional positional actuator to project a graphical display with a warning symbol onto a side of the subject vehicle.

5. The system of claim 4,
   wherein the controller is in communication with the blind spot monitoring system and controls the at least one additional light source projector and the at least one additional positional actuator mounted on the subject vehicle to project the graphical display with the warning symbol onto the side of the subject vehicle in response to the blind spot monitoring system detecting the secondary vehicle located in the at least one blind spot alert area.

6. The system of claim 4, wherein the vehicle includes a tractor unit and a semi-trailer and the at least one additional light source projector is mounted to the semi-trailer.

7. The system of claim 4, wherein the vehicle includes a tractor unit and a semi-trailer and the at least one additional light source projector is mounted to the tractor unit.

8. The system of claim 1, wherein the vehicle includes a tractor unit and a semi-trailer and the at least one light source projector is mounted to the tractor unit.

9. A method comprising:
   controlling, with a controller, at least one light source projector with at least one positional actuator mounted on a subject vehicle, the controller controlling the at least one light source projector and the at least one positional actuator to project at least one laser line on a roadway upon which the subject vehicle is traveling, a location of the at least one laser line corresponding to at least one blind spot alert area of the subject vehicle; and
   monitoring, with a blind spot monitoring system having a blind spot sensor, the at least one blind spot alert area, the blind spot monitoring system being in communication with the controller;
   detecting, with the blind spot monitoring system, when a secondary vehicle enters the at least one blind spot alert area;
   controlling, with the controller, the at least one light source projector to project the at least one laser line on the roadway with a first color in response to the blind spot monitoring system detecting that no secondary vehicles are located within the at least one blind spot alert area, with a second color in response to the blind spot monitoring system detecting that a secondary vehicle has been located within the at least one blind spot alert area for a first predetermined time period, and with a third color in response to the blind spot monitoring system detecting that the secondary vehicle has been located within the at least one blind spot alert area for a second predetermined time period.

10. The method of claim 9,
    controlling, with the controller, the at least one light source projector to change a color of the at least one laser line projected on the roadway in response to the blind spot monitoring system detecting a secondary vehicle located in the at least one blind spot alert area.

11. The method of claim 9,
    controlling, with the controller, the at least one light source projector to perform blinking or flashing of the at least one laser line projected on the roadway in response to the blind spot monitoring system detecting a secondary vehicle located in the at least one blind spot alert area.

12. The method of claim 9, further comprising:
    controlling, with the controller, at least one additional light source projector with at least one additional positional actuator mounted on the subject vehicle to project a graphical display with a warning symbol onto a side of the subject vehicle.

13. The method of claim 12,
    controlling, with the controller, the at least one additional light source projector and the at least one additional positional actuator mounted on the subject vehicle to project the graphical display with the warning symbol onto the side of the subject vehicle in response to the blind spot monitoring system detecting the secondary vehicle located in the at least one blind spot alert area.

14. The method of claim 12, wherein the vehicle includes a tractor unit and a semi-trailer and the at least one additional light source projector is mounted to the semi-trailer.

15. The method of claim 12, wherein the vehicle includes a tractor unit and a semi-trailer and the at least one additional light source projector is mounted to the tractor unit.

16. The method of claim 9, wherein the vehicle includes a tractor unit and a semi-trailer and the at least one light source projector is mounted to the tractor unit.

\* \* \* \* \*